United States Patent
Ala-Laurila et al.

(10) Patent No.: US 8,036,637 B2
(45) Date of Patent: *Oct. 11, 2011

(54) BILLING IN A PACKET DATA NETWORK

(75) Inventors: Juha Ala-Laurila, Tampere (FI); Jyri Rinnemaa, Tampere (FI); Jukka-Pekka Honkanen, Tampere (FI); Timo Takamaki, Pirkkala (FI); Raimo Vuonnala, Espoo (FI); Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 108 days.

This patent is subject to a terminal disclaimer.

(21) Appl. No.: 12/141,024

(22) Filed: Jun. 17, 2008

(65) Prior Publication Data

US 2008/0311884 A1 Dec. 18, 2008

Related U.S. Application Data

(63) Continuation of application No. 10/239,142, filed as application No. PCT/FI01/00295 on Mar. 23, 2001, now Pat. No. 7,389,105.

(51) Int. Cl.
*H04M 11/00* (2006.01)
*H04M 3/16* (2006.01)
*H04L 9/00* (2006.01)

(52) U.S. Cl. .......... 455/406; 455/411; 380/262
(58) Field of Classification Search .......... 455/406, 455/411, 445, 509, 410, 466, 66.1, 90.1, 455/414.2; 370/401; 705/35, 53, 39; 726/4; 713/176, 20; 235/380; 380/262; 720/20
See application file for complete search history.

(56) References Cited

U.S. PATENT DOCUMENTS

| | | | | |
|---|---|---|---|---|
| 5,734,981 A * | 3/1998 | Kennedy et al. | ............ | 455/445 |
| 5,809,144 A * | 9/1998 | Sirbu et al. | ............ | 705/53 |
| 6,138,107 A * | 10/2000 | Elgamal | ............ | 705/39 |
| 6,196,458 B1 * | 3/2001 | Walker et al. | ............ | 235/380 |
| 6,240,091 B1 * | 5/2001 | Ginzboorg et al. | ............ | 370/401 |
| 6,337,911 B1 * | 1/2002 | Dillon | ............ | 380/262 |
| 7,032,241 B1 * | 4/2006 | Venkatachary et al. | ............ | 726/4 |
| 2002/0133457 A1 * | 9/2002 | Gerlach et al. | ............ | 705/39 |

* cited by examiner

*Primary Examiner* — Kiet Doan
(74) *Attorney, Agent, or Firm* — AlbertDhand LLP

(57) ABSTRACT

A method for billing in a packet data network (WISP1) comprising at least one user's terminal (MN), comprising the steps of:
forming a data link between the terminal and the packet data network;
requesting a user identity from the terminal;
generating billing data based on the user identity; and
sending the billing data to an accounting server (HAAA) of an external telecommunications network.

11 Claims, 12 Drawing Sheets

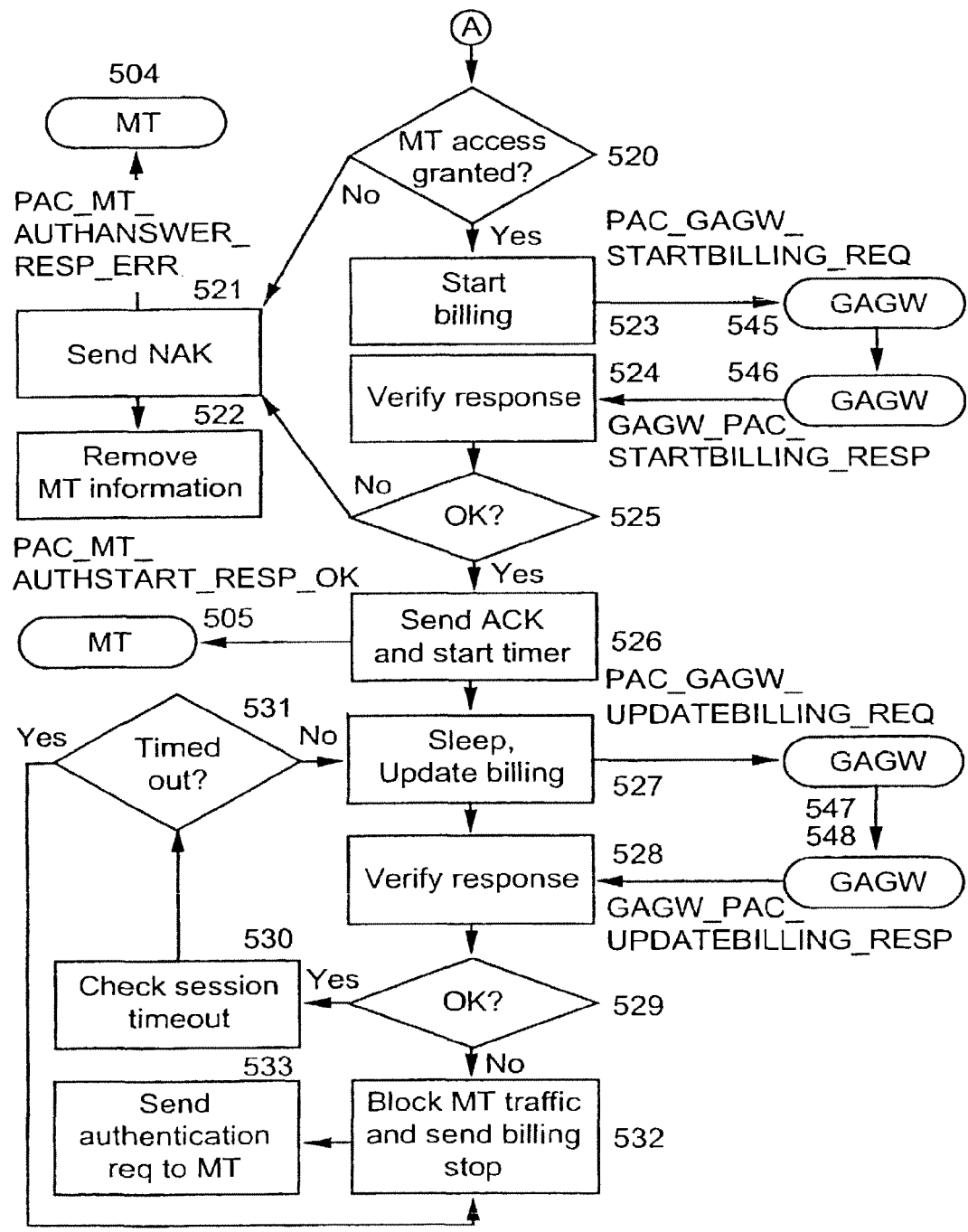
Fig. 5β

BILLING IN A PACKET DATA NETWORK

CROSS-REFERENCE TO RELATED PATENT APPLICATIONS

Finland Priority Application 20000761, filed Mar. 31, 2000 including the specification, drawings, claims and abstract, is incorporated herein by reference in its entirety. This application is a Continuation of U.S. application Ser. No. 10/239,142 filed Feb. 20, 2003 now U.S. Pat. No. 7,389,105 (National Stage of PCT/FI01/00295), filed Mar. 23, 2001, incorporated herein by reference in its entirety.

BACKGROUND OF THE INVENTION

1. Field of the Invention

This invention relates to packet data networks and is in particular but not necessarily related to authentication and billing of a mobile station connecting to a mobile IP (Internet Protocol) network.

2. Description of the Prior Art

For authenticating in the Internet, a shared secret must first be provided both to the packet data network as well as to the mobile node so that the secret can be used as a basis for authentication. Then, some authentication procedure has to be executed in order to authenticate a node to another node.

RADIUS (Remote Authentication Dial In User Service) is an Internet standards track protocol described in a memo rfc2138.txt, April 1997, by C. R. Livingston, A R. Merit, W. S. Daydreamer, and S. W. Livingston. The RADIUS protocol is designed for carrying authentication information, authorization information and configuration information between a Network Access Server which desires to authenticate its links and a shared Authentication server. Servers implementing RADIUS can support a variety of user authentication methods. When the server is provided with a user name and original password given by a user, it can support the Point-To-Point Protocol (PPP), the Password Authentication Protocol (PAP), the Challenge Handshake Authentication Protocol (CHAP), UNIX login and other authentication mechanisms.

A memo rfc2139.txt, April 1997, by C. R. Livingston deals with RADIUS accounting. Here, the RADIUS protocol is used to carry accounting information between a Network Access Server and a shared Accounting Server.

SUMMARY OF THE INVENTION

The invention is a method and system for authentication and billing in a packet data network where an external mobile telecommunications network and its Subscriber Identity Modules (SIM) are utilized to authenticate a terminal requesting connection to the packet data network. Furthermore, the packet data network uses the external mobile telecommunications network for billing.

According to a first aspect of the invention there is provided a billing method in a packet data network, comprising the steps of:
forming a data link between the terminal and the packet data network;
requesting a user identity from the terminal;
generating billing data based on the user identity; and
sending the billing data to an accounting server; characterized in that
the accounting server is an accounting server of an external telecommunications network.

Here, the external telecommunications network refers to a telecommunications network that does not contain the access link that is formed between the packet data network and the terminal.

Preferably, the method further comprises the steps of providing the terminal with access to a Subscriber Identity Module (SIM) having the user identity. Preferably, the method further comprises the step of authenticating the terminal using the subscriber identity module.

Preferably, the method further comprises the steps of:
generating a billing code corresponding to the price of accessing the packet data network;
generating a cryptographic checksum using at least the billing code; and
using the cryptographic checksum in a billing set up to verify that the user is provided with the correct price and that the user has accepted the access for that correct price.

Advantageously, a secret need not necessarily be shared between the mobile node and the packet data network for authenticating the mobile node to the packet data network. Additionally, reliable identification and billing of users is achieved without causing significant amount of extra work and expenses.

According to a second aspect of the invention there is provided a method for billing a user of a service comprising the steps of:
accessing a shared secret that is also known by a telecommunications network;
receiving an offer for a commercial service, including the price of the service; and
verifying the authenticity of the offer using the shared secret.

According to a third aspect of the invention there is provided a method for handling billing information comprising the steps of:
receiving an offer for a service from a telecommunications network, including a price;
providing the offer for a packet data network for the offer to be forwarded to a user terminal;
receiving a response from the packet data network; and
verifying the response to detect if the response is generated using the price of the service and a shared secret accessible to the terminal and to the telecommunications network.

According to a fourth aspect of the invention there is provided a data terminal comprising:
means for accessing a shared secret that is also known by a telecommunications network;
means for receiving an offer for a commercial service, including the price of the service; and
means for verifying the authenticity of the offer using the shared secret.

According to a fifth aspect of the invention there is provided a system comprising:
a packet data network having at least one user's terminal;
means for forming a data link between the terminal and the packet data network;
means for requesting a user identity from the terminal;
means for generating billing data based on the user identity; and
means for sending the billing data to an accounting server of an external telecommunications network.

According to a sixth aspect of the invention there is provided a data network element comprising:
means for receiving an offer for a service from a telecommunications network, including a price;

means for providing the offer for a packet data network for the offer to be forwarded to a user terminal;

means for receiving a response from the packet data network; and means for verifying the response to detect if the response is generated using the price of the service and a shared secret accessible to the terminal and to the telecommunications network.

According to a seventh aspect of the invention there is provided a computer program for controlling a packet data network comprising at least one user's terminal, comprising:

computer program code for causing the network to form a data link between the terminal and the packet data network;

computer program code for causing the network to request a user identity from the terminal;

computer program code for causing the network to generate billing data based on the user identity; and computer program code for causing the network to send the billing data to an accounting server of an external telecommunications network.

According to an eighth aspect of the invention there is provided a computer program product for controlling a packet data network comprising at least one user's terminal, comprising:

computer program code for causing the network to form a data link between the terminal and the packet data network;

computer program code for causing the network to request a user identity from the terminal;

computer program code for causing the network to generate billing data based on the user identity; and computer program code for causing the network to send the billing data to an accounting server of an external telecommunications network.

According to a ninth aspect of the invention there is provided a memory media comprising a computer program for controlling a packet data network comprising at least one user's terminal, the memory media comprising:

computer program code for causing the network to form a data link between the terminal and the packet data network;

computer program code for causing the network to request a user identity from the terminal;

computer program code for causing the network to generate billing data based on the user identity; and computer program code for causing the network to send the billing data to an accounting server of an external telecommunications network.

BRIEF DESCRIPTION OF THE DRAWINGS

The invention will now be described, by way of example only, with reference to the accompanying drawings, in which.

DESCRIPTION OF THE PREFERRED EMBODIMENTS

Figure 1:
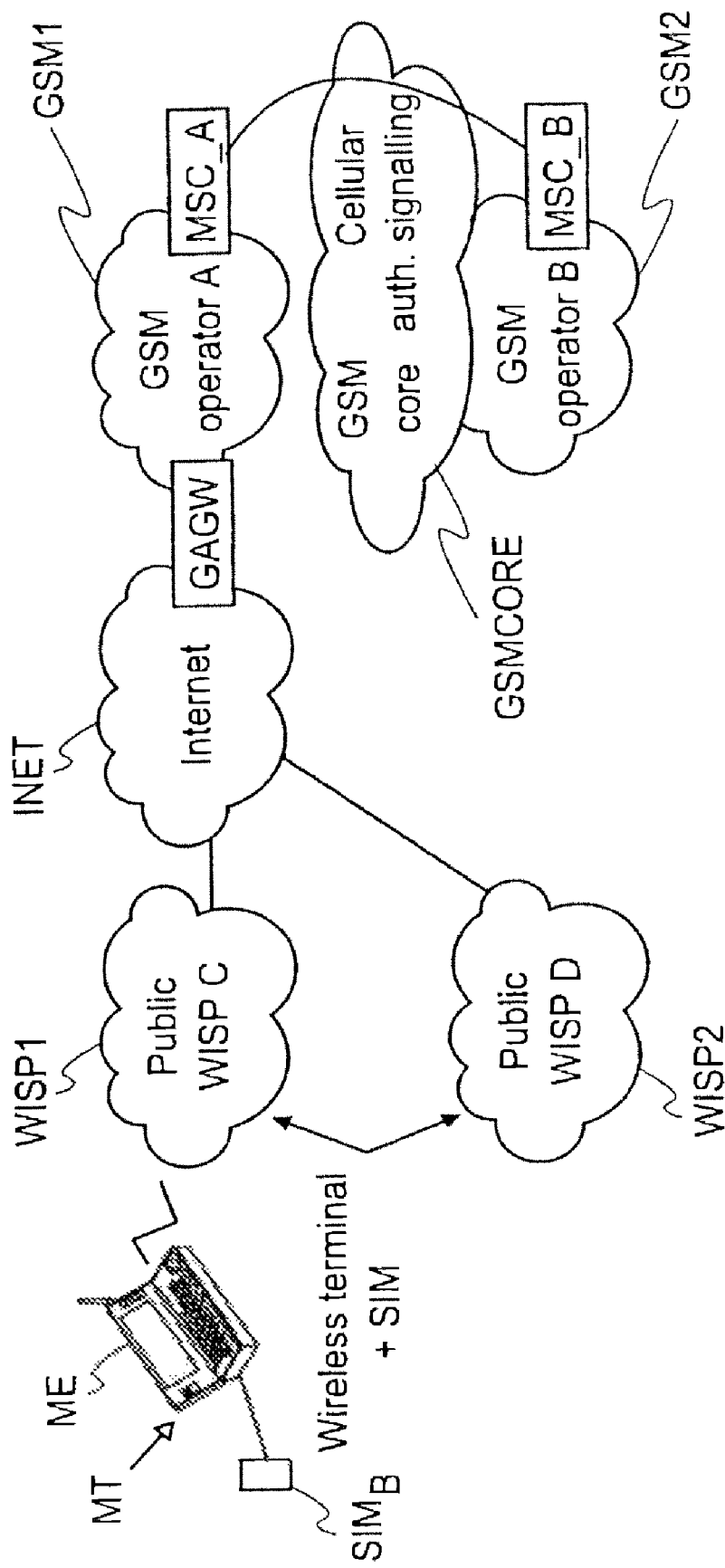
FIG. 1 shows architecture of a mobile communication system according to a preferred embodiment of the invention.

FIG. 1 shows an architecture of a mobile communication system according to another embodiment of the invention. The system comprises a terminal MT, two public Wireless IP access networks WISP1 and WISP2, the Internet INET, a first GSM telecommunications network GSM1 and a second GSM telecommunications network GSM2 connected to a GSM core GSMCORE. The public wireless IP access network (WISP1, WISP2) offers wireless broadband IP services that the terminals can roam in public hot spots, such as hot spots provided by hotels, airports etc. The WISP network can be operated either by a GSM telecommunications network operator or by a private ISP with a roaming agreement with a GSM telecommunications network operator. The roaming agreement is essential for SIM authentication. The terminal can connect to a WISP. The terminal can also roam from one network to another using a known technique. In a Wireless Local Area Network, the roaming from one WLAN hot spot to another is referred to as WLAN roaming service. The WISPs have access to the Internet INET.

The terminal MT has an equipment part ME and a SIM provided for use with the second GSM telecommunications network GSM2. The MT may not be a GSM compliant mobile station. In this case a user of the MT can access the second GSM telecommunications network GSM2 by providing a GSM mobile station with a SIM. In a preferred embodiment, the MT is a laptop computer equipped with a WLAN adapter card (not shown) and a smart card reader (not shown) that can use the SIM. Alternatively, the MT is a device having a GSM mobile station part for communicating with GSM telecommunications networks and a WLAN terminal part for communicating with WLANs.

Both GSM telecommunications networks GSM1 and GSM2 comprise respective Mobile Switching Centers MSCA and MSCB. The GSM core couples these MSCs together. Furthermore, the first GSM telecommunications network has a GSM/GPRS Authentication and Billing GateWay (GAGW) coupling it to the Internet INET. The GAGW is the GSM telecommunications network operator's entity which provides the GSM authentication services to WISPs and collects the charging information.

GSM telecommunications networks, which are connected to the GSM core, can further be connected through the GAGW to the WISP (to which the MT is connected) and to the mobile MT for authentication and billing purposes as will be described in more detail later.

The operation of the system will now be described. The user has a GSM agreement with GSM telecommunications network operator B (of GSM2) and so is the user's home network operator. The network operator B has signed a roaming agreement with GSM telecommunications network operator A (of GSM 1). The GSM telecommunications network operator A has partner arrangements with the operators of WISP1 and WISP2, referred to, respectively, as operators C and D. The roaming user with the SIM may roam from WISP1 to WISP2. Both WISPs send authentication 30 request messages to the network operator A. The GSM core network roaming functionality is used for relaying the authentication messages to the subscriber's home operator B (GSM2). The architecture allows users of either GSM telecommunications network to roam with their MTs between WISPs, although the WISPs have direct connection only to operator A network GSM 1.

A roaming user need not have a pre-established customer relationship with a WISP. Instead, the roaming user may rely on his customer relationship with his home GSM telecommunications network in order to provide authentication and billing in the WLAN. WISP access is charged to the roaming user's GSM bill via a GSM telecommunications network operators' authentication gateway.

A home operator provides the roaming MT with a SIM card for authentication therein. In this example, the home operator is the second GSM network GSM2. The SIM can be used for authenticating a GSM mobile station to the second GSM network GSM2. The second GSM network is alternatively a GSM network supporting GPRS. The GSM core GSMCORE provides roaming services for a GSM mobile station roaming between various operator networks. Here, these roaming services are used for allowing an MT to be authenticated and charged using GSM SIM both for accessing the GSM core as well as public IP access networks. The GSM telecommunications network operator bills the user for both the authenticating/roaming services and for the use of public IP access networks. Then, the GSM telecommunications network operator reimburses the use of public IP access networks for their operators.

In an alternative embodiment of the invention, the GSM telecommunications network operator may provide the subscriber with a WISP roaming SIM, which does not allow use of the GSM radio services. Such a dedicated SIM can be used to authenticate and debit services provided by a WLAN.

As is known from GSM, the home GSM network stores customer information, such as authentication codes and user identity. Typically, this information is stored in a GSM Home Location Register (HLR). The GSM telecommunications network operator provides the IP based authentication and charging interface for one or several WISP operators, possibly also or only for corporate access solutions.

The GAGW supports seamless roaming between various GSM telecommunications network operators. The WISP sends all the authentication and billing information to the GAGW. The GAGW uses GSM core signaling known from GSM and conveys the authentication and billing information to the corresponding home GSM telecommunications network operator. The signalling of billing information between different GSM telecommunications networks can be arranged in a similar manner as when ordinarily roaming to a foreign GSM telecommunications network for a mobile telephone call. In this case, the foreign GSM telecommunications network charges the home GSM telecommunications network for service of arranging the telephone call.

The home operator stores the charging records and sends the bill to the user. The WISP generates a billing record describing the billed services. The billing can be based on any of the known principles or combination of them, for example on flat rate, usage time or packet number or access bandwidth. The GSM network (GAGW) transmits the WISP originated records to the existing GSM billing system.

The MT supports authentication using SIM card. In an alternative embodiment, the MT supports one or more other authentication mechanisms, for example smart card authentication for corporate network access. Such a terminal contains authentication software and the SIM card but need not have keys for public access or any other security association.

Figure 2:
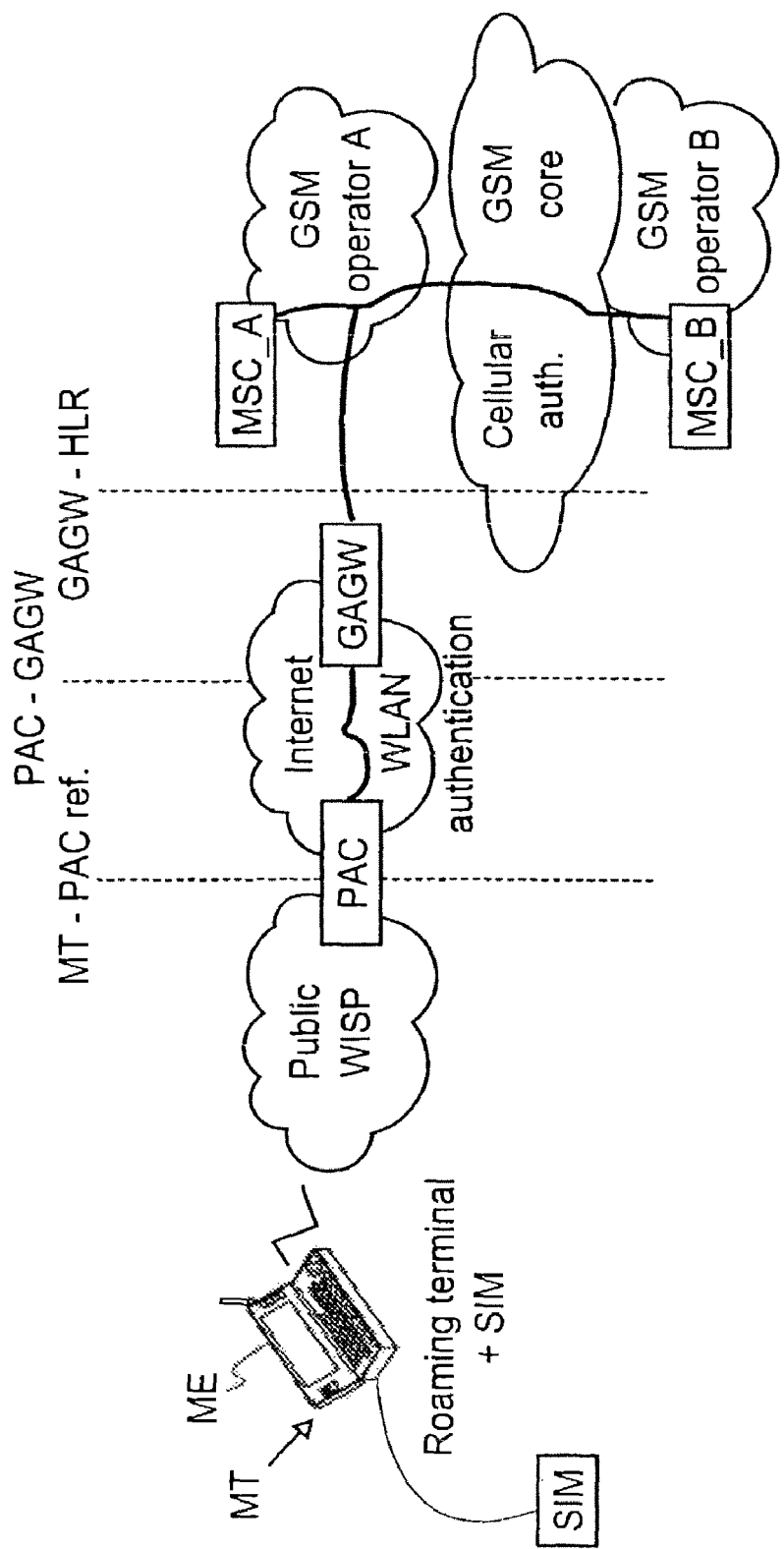
FIG. 2 shows significant functional blocks of the system of FIG. 1.

FIG. 2 shows significant functional blocks of a system of FIG. 1. FIG. 2 only shows a single WISP although it is understood that more than one WISP and GSM telecommunications network may be present. FIG. 2 shows three important functional elements of the system: the mobile terminal MT, a Public Access Controller PAC and the GPRS/GSM Authentication and Billing Gateway GAGW. The GAGW is a dedicated entity of the GSM telecommunications network that interfaces the GSM/GPRS network with an IP network (for example, the Internet or a wide area IP network). The GAGW also offers the necessary WAN-cellular roaming functions, in particular those related to authentication and billing services.

The PAC is the WISFs network entity which controls access from the radio access network to the Internet services. In the preferred embodiment, PAC allocates an IP address for the MT and authenticates the MT before the connection to the Internet is established. The PAC relays the authentication messages between the MT and the GAGW, collects the billing record and sends the billing record to GAGW. The PAC also relays the user data traffic between the MT and the Internet.

In a preferred embodiment, the SIM authentication is a complementary service for the PAC and the PAC supports additionally other authentication mechanisms such as password based authentication.

The interfaces of the system will now be described.

The MT-PAC interface is an IP based interface that is provided with authentication functionality. The authentication is designed so that it can be embedded in a well-known standard IP protocol or implemented as an extension for the existing protocol. The MT and PAC are identified using their IP addresses in this interface.

The PAC-GAGW interface is an IP based interface that uses a suitable authentication protocol. Typically, a single GAGW supports several PACs simultaneously. The GAGW identifies various PACs with their IP addresses. In this interface, the MT identification is based on an IMSI code stored on the SIM.

The GAGW-HLR interface is implementation and vendor specific. The GAGW hides the cellular infrastructure from PACs. Therefore, the PAC-GAGW interface is always the same although the underlying cellular network may be of a different type (GSM, GPRS) or provided by a different vendor.

Figure 3:
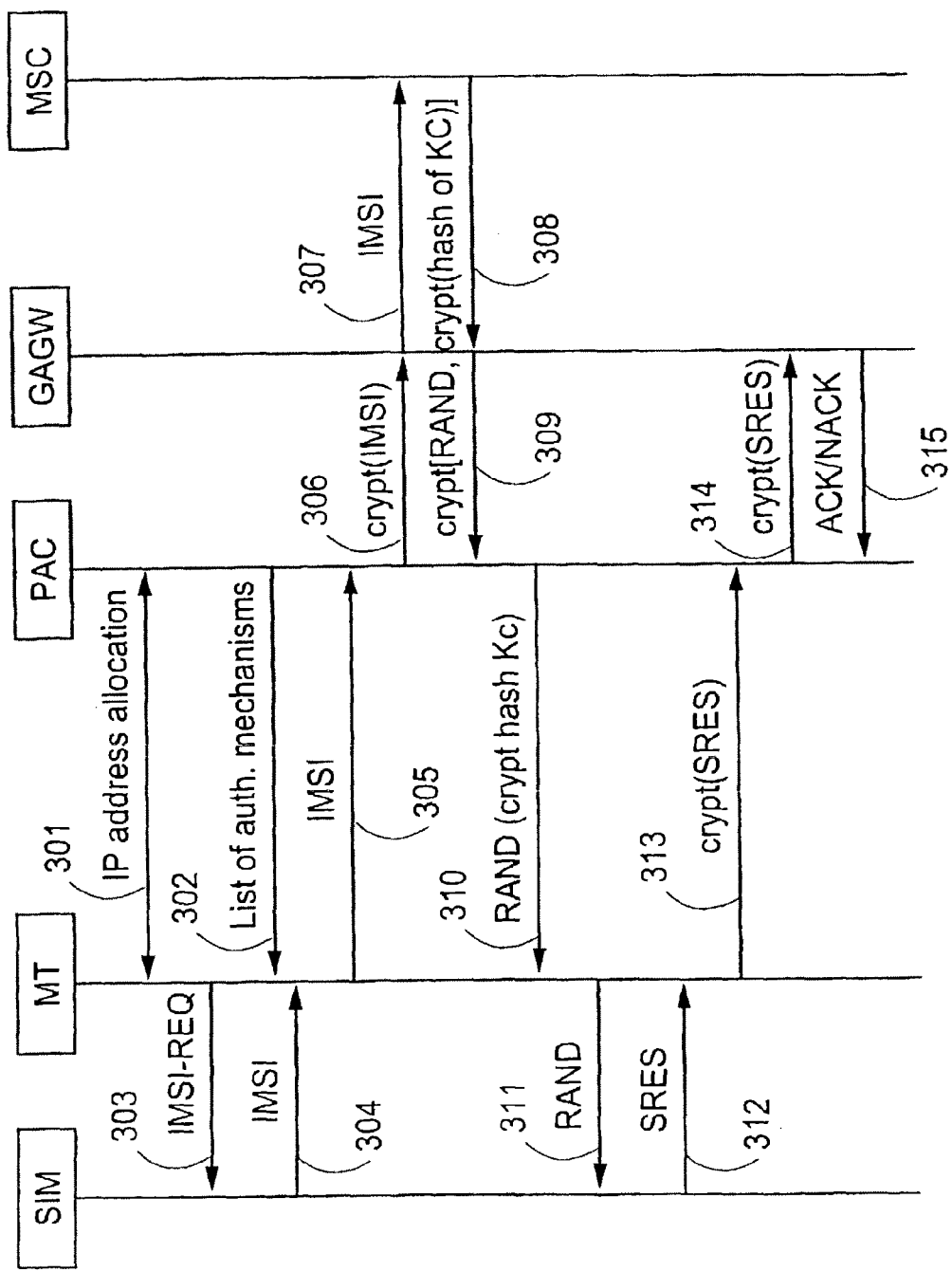
FIG. 3 shows the major signalling events of a system of FIG. 1.

FIG. 3 shows the major signalling steps of a system of FIG. 1. The process of authenticating a WLAN terminal to the PAC is typically triggered when an MT attempts to connect to the public access network. In this case, the MT acquires an IP address via a dynamic host configuration protocol (DHCP) server (not shown). The DHCP protocol and appropriate servers are well known in the art. The authentication has to be completed before the network beyond the PAC can be accessed. The MT triggers the authentication by roaming software. In an alternative embodiment, the authentication is automatically triggered when the MT tries to access to the network using SIM authentication and the roaming application is running.

An overview of the authentication is next explained by reference to the signals used during the authentication process:

301. The MT communicates with the PAC to connect to the radio access network (WISP) and to obtain an IP address from a DHCP server.
302. The PAC sends information of the supported authentication mechanisms, such as SIM authentication, Public Key Infrastructure (PKI) or pre-shared key.
303. The MT detects that SIM authentication is supported. The ME requests the IMSI from the SIM.
304. The SIM responds to the request by sending the IMSI to the ME.
305. The MT forms a Network Access Identifier that is the IMSI in a Network Access Identifier (NAI) format, for example 1234567@gsm.org, where 1234567 is the IMSI number and gsm.org is the domain name of the home GSM telecommunications network. The MT establishes a dynamic security association with the PAC, for example using Diffie-Hellman, and sends the NAI encrypted over the temporary secure channel. In an alternative embodiment, the NAI is sent as cleartext without encryption.
306. The PAC decrypts the NAI, and forwards it in a data packet, again encrypted, to the GAGW over the secure PAC-GAGW. The I IP address of GAGW is statically configured in the PAC. A secure channel is formed between the PAC and the GAGW using secret they share.
307. The GAGW verifies that the packet came from a valid PAC, decrypts the packet, checks the NAI and sends the IMSI in it with an authentication request to the nearest MSC. Next, the MSC analyses the IMSI to find out the home HLR of the subscriber. Then, the MSC forwards the authentication request to the home HLR.
308. The home HLR forms a set of one or more GSM authentication triplets (RAND, SRES, Kc) and sends the set to the originator MSC which forwards the information to the GAGW.
309. The GAGW forms a packet containing the RANDs and a cryptographic checksum of the RANDs, generated using at least the Kcs. The GAGW preserves the SRES for later use in a subsequent step 314.
310. The PAC decrypts the packet and relays the RANDs and the cryptographic checksum to the MT.
311. The MT inputs the RANDs to the SIM, which calculates corresponding Kc and SRES values.
312. The MT checks that the Kcs match with the cryptographic checksum given by the PAC. If they match, the MT knows that the PAC has a connection to the HLR and so the PAC can be trusted.
313. The MT generates a cryptographic checksum for the SRESs with Kc and sends the checksum to the PAC.
314. The PAC relays the checksum of the SRES to the GAGW. The GAGW checks that the checksum matches with the SRESs it received from the MSC in step 308. If the checksum matches, the GAGW sends an acknowledge message ACK to the PAC. If the checksum does not match, then the GAGW sends a negative acknowledge NACK to the PAC.
315. If the PAC receives a positive acknowledge message ACK confirming successful authentication, the PAC completes the authentication by opening the access to the Internet. If the PAC receives a negative acknowledge message NACK, it refuses to open access to the Internet.

In an alternative embodiment, the IMSI is used in the preceding steps instead of the NAI.

The following tables list the information elements that are carried between elements of the system:

TABLE 1

Main parameters transferred between the MT and the GAGW

| Parameter | Direction to | Encryption | Explanation |
| --- | --- | --- | --- |
| IMSI/NAI | GAGW | X | User ID for cellular network side |
| RAND | MT | | Random authentication Challenge |
| SRES | GAGW | x | Authentication response to the HLR |
| Hash(K_MT) | MT | X | Authentication checksum for the MT |
| Hash(K_GAGW) | GAGW | X | Authentication checksum for the GAGW |

TABLE 2

Main parameters transferred between the MT and the PAC

| Parameter | Direction to | Encryption | Explanation |
| --- | --- | --- | --- |
| IMSI/NAI | PAC | X | User ID for cellular network side |
| Bill_ind | MT | | Information of the costs |

TABLE 3

Main parameters transferred between the PAC and the GAGW

| Parameter | Direction to | Encryption | Explanation |
| --- | --- | --- | --- |
| Bill_ind | PAC | | Access pricing info |
| User_class | PAC | x | User class/profile (business, consumer, . . . ) |
| K_RAN | PAC | x | Air interface encryption key |
| CDR | GAGW | x | User's billing record (structure tbd) |

In the preferred embodiment, an optional user class parameter is used for defining the quality of service, for example the maximum bandwidth for a particular user.

Figure 4:
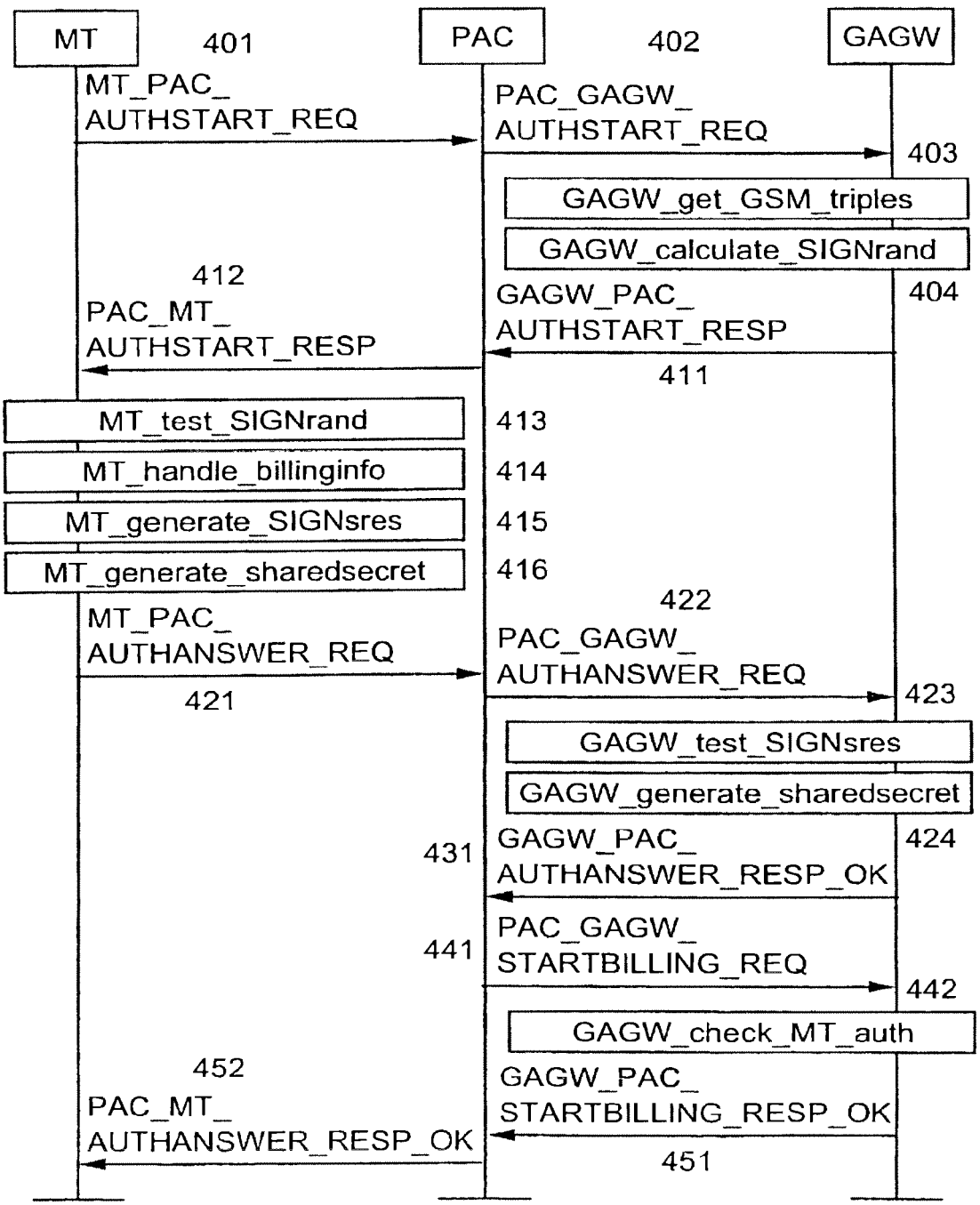
FIG. 4 shows a detailed signalling chart of an authentication operation of a system of FIG. 1.

FIG. 4 shows a detailed signalling chart of an authentication of a system of FIG. 1. The chart presents the following steps:
401. The MT sends an MT originated authentication starting request MT_PAC_AUTHSTART_REQ containing the NAI having the IMSI. The message typically also contains a protection code MN_RAND (known also as nonce in the context of mobile IP).
402. The PAC receives the message MT_PAC_AUTHSTART_REQ from the MT and requests for GSM triplets by sending to the GAGW a message PAC_GAGW_AUTHSTART_REQ, also containing the NAI and the MN_RAND.
403. The GAGW obtains the GSM triplets from the home GSM telecommunications network. One triplet suffices, but the GSM telecommunications network may return a plurality of triplets, in which case either some of the triplets are discarded or stored for later use, or according to the preferred embodiment, used to generate a stronger key. The home GSM telecommunications network is recognised using the NAI.
404. The GAGW generates a session key, using an encryption algorithm, of at least the GSM session key(s) Kc. In the preferred embodiment, the MN_RAND is also used in the encryption. The GAGW encrypts the GSM RAND(s) of GSM triplets, computes a cryptographic checksum, or a Message Authentication Code MAC, based on the RAND(s) and the session key, and prepares an authentication start response message GAGW_PAC_AUTHSTART_RESP. The encryption between the GAGW and the PAC is based on their own shared secret.

411. The GAGW sends to the PAC an authentication start response message GAGW_PAC_AUTHSTART_RESP containing the RANDs, the MAC, the MN_RAND, a billing information code, a session ID and a billing information MAC computed for the billing information code. Typically, the authentication start response message additionally contains a field for session timeout parameter for determining the validity period of the new session key to be generated and a field for a state of the session.

412. The PAC forwards to the MT the authentication start response message GAGW_PAC_AUTHSTART_RESP as a PAC_MT_AUTHSTART_RESP message.

413. The MT tests with the SIGNrand that the parameters carried by the GAGW_PAC_AUTHSTART_RESP and the PAC_MT_AUTHSTART_RESP indeed originate from the GSM telecommunications network.

414. The MT handles the billing information received from the GAGW. Typically, the MT provides the user with an information of the price of the service requested by the user. Usually, this price is based on at least one of the following: a flat rate fee, a time based billing, number of data packets sent to or from the MT, and the Quality of Service QoS. The MT then asks the user whether the service should be obtained with the price given. The MT receives an answer from the user.

415. The MT generates a MAC of the SRESs to be used for responding to the GAGW.

416. The MT generates the shared secret Kpac_MT using at least the Kcs.

421. The MT generates and sends an MT_PAC_AUTHANSWER_REQ message to the PAC. The message contains in the state field the answer for the user showing whether the user accepted the billing for the service, the MAC of the SRESs, a MAC of the billing code, and the MN_RAND (as all the messages sent during an authenticating session).

422. The PAC generates a PAC_GAGW_AUTHANSWER_REQ containing the data of the MT_PAC_AUTHANSWER_REQ message and additionally the NAI and the IP address of the PAC.

423. The GAGW tests the MAC of the SRESs to verify that the data sent by the MT carried by the PAC_GAGW_AUTHANSWER_REQ has not been tampered.

424. If the GAGW gets a positive answer to the test, the GAGW generates the shared secret Kpac_MT in a manner similar to that used by the MT in step 416 and the proceeds to the step 431.

431. The GAGW sends to the PAC a message GAGW_PAC_AUTHANSWER_RESP_OK. The message contains the MN_RAND and codes filter id, Kpac_MT and SIGNresult. The filter is an optional code and indicates the user class of the subscriber. This can be used in defining a QoS, for example a high quality connection for well paying business users. The Kpac_MT is the shared secret. The SIGNresult is a MAC of the data in the message for ultimately verifying to the MT that the reply from the GAGW is not altered on the way to the MT.

441. The PAC responds to the GAGW by a PAC_GAGW_STARTBILLING_REQ message requesting the GAGW to start the billing. The message contains the NAI and the session ID for identifying the connection.

442. The GAGW checks the answer from the MT for verifying that the MT has permitted the billing.

451. If the MT permitted billing, the GAGW sends to the PAC a message GAGW_PAC_STARTBILLING_RESP_OK for indicating the start of billing.

452. The PAC sends to the MT a PAC_MLAUTHANSWER_RESP_OK message containing the SIGNresult.

453. The MT receives the PAC_MT_AUTHANSWER_RESP_OK message and checks the SIGNresult it contains. If the SIGNresult is correct, the MT can inform the user of a start of billing.

The MAC of the billing code is computed at least using the Kcs so that the PAC cannot tamper the billing code.

In the message PAC_MT_AUTHANSWER_RESP_OK, the MT is notified of the term of the authentication. The MT re-authenticates itself before the authentication term expires. If the MT does not re-authenticate, the connection of the MT to the PAC is released and the MT can authenticate itself again.

In the preferred embodiment, the MT receives billing information and decides how to handle the billing information. In the preferred embodiment of the invention, the user of the MT can define a billing information handling policy. This policy can be used to define, for example, that no billing information is presented to the user in a re-authentication or normal authentication case. The handling of the billing information does not affect the protocol of messaging between the different entities (MT, PAC, GAGW, MSC and HLR).

FIGS. 5A and B show the functionality of the PAC during the authentication. In this figure, all of the blocks relate to the PAC except those that are marked as "MT" or "GAGW". The drawing will be described by referring to each of the blocks by their reference sign.

The operation starts from block 501. A MT requests authentication from the PAC by sending an MT_PAC_AUTHSTART_REQ message containing the MN_RAND and the NAI to the PAC, thus triggering the authentication process there (block 511). The PAC maps (block 512) an IP address MT_IP for the MT. The PAC checks first whether it already has an IP address mapped for that NAI If the PAC has the PAC address, the PAC retrieves the mapping from a database record (block 513). Otherwise the PAC obtains an IP address and stores the IP address with the NA, to a database for future use.

After mapping (block 512) of the IMSI with an IP address, the PAC relays (block 514) the NAI to the GAGW (block 541) in a PAC_GAGW_AUTHSTART_REQ message. The GAGW responds (block 542) by a GAGW_PAC_AUTHSTART_RESP message containing a random number RAND to be used as a challenge. In block 515, The PAC receives the challenge and maps a session ID code SESSION ID to the MT_IP. Next, the PAC updates the database record (block 516) by storing the SESSION_ID with the MT IP and the IMSI. Then, the PAC sends (block 517) the challenge RAND to the MT in a PAC_MT_AUTHSTART_RESP message. The MT receives (block 502) the message, generates and responds (block 503) with an MT_PAC_AUTHANSWER_REQ message containing a cryptographic checksum SIGN_SRES corresponding to the challenge and the challenge itself. The PAC receives the SIGN_SRES and relays (block 518) SIGN_SRES to the GAGW which checks (block 543) whether it is correct. The GAGW returns (block 544) to the PAC a GAGW_PAC_AUTHANSWER_RESP message to inform the PAC whether the SIGN SRES is correct. Alternatively, the GAGW may compute the correct SIGN_SRES and returns SIGN_SRES to the PAC so that the PAC itself verifies whether the MT generated SIGN_SRES is correct. In either case, the PAC verifies (block 519) the response from the GAGW and decides (block 520) next actions based on the response. If the response is positive, that is successful authentication, then the PAC proceeds to block 523 to start billing. Otherwise, the execution proceeds to block 521. There, a NACK is sent as a PAC_MT_AUTH_ANSWER_RESP_ERR to the MT to indicate an error in the authentication and the SESSION_ID is removed (block 522) from the record in which SESSION_ID was stored.

Next, the steps related to billing are explained. In block 523, a message PAC_GAGW_STARTBILLING_REQ is sent to the GAGW. The message informs the GAGW the possibility to apply charges to the account of the user of the MT to be added in a GSM invoice. The GAGW receives (block 547) this message and replies with a message GAGW_PAC_STARTBILLING_RESP as a confirmation. The message is verified (block 524) by the PAC, and in case of a denial instead of confirmation, the PAC returns to block 521. Otherwise, (block 526) an acknowledge message PAC_MT_AUTHSTART_RESP_OK is sent to the MT to confirm the start of possible billing and a timer is started.

In the next phase, the PAC remains idle and provides periodical billing updates. These updates are triggered by debited events, such as transmission or reception of data packets. The PAC may combine the charges and, only after a certain period of time or after reaching of a certain triggering amount of charge, perform a billing update corresponding to the lump sum thus gathered. When billing an event, the PAC sends a PAC_GAGW_UPDATEBILLING_REQ to notify the GAGW about the billing update. The GAGW receives (block 547) this message and responds (block 548) by a receipt message GAGW_PAC_UPDATEBILLING_RESP. The PAC receives (block 528) the receipt and checks (block 529) if the receipt is positive. If the receipt is negative, the PAC prevents (block 532) MT for transferring data packets to and from the WISP, sends a billing stop to the GAGW, and sends (block 533) an authentication request to the MT for its re-authentication. On the other hand, if the receipt is positive in block 529, the PAC checks (block 530) the timer to detect a session timeout. If a timeout is detected, the PAC continues to block (block 532) and proceeds as described above. If no timeout is detected, the PAC operation returns to block 527.

Figure 5:
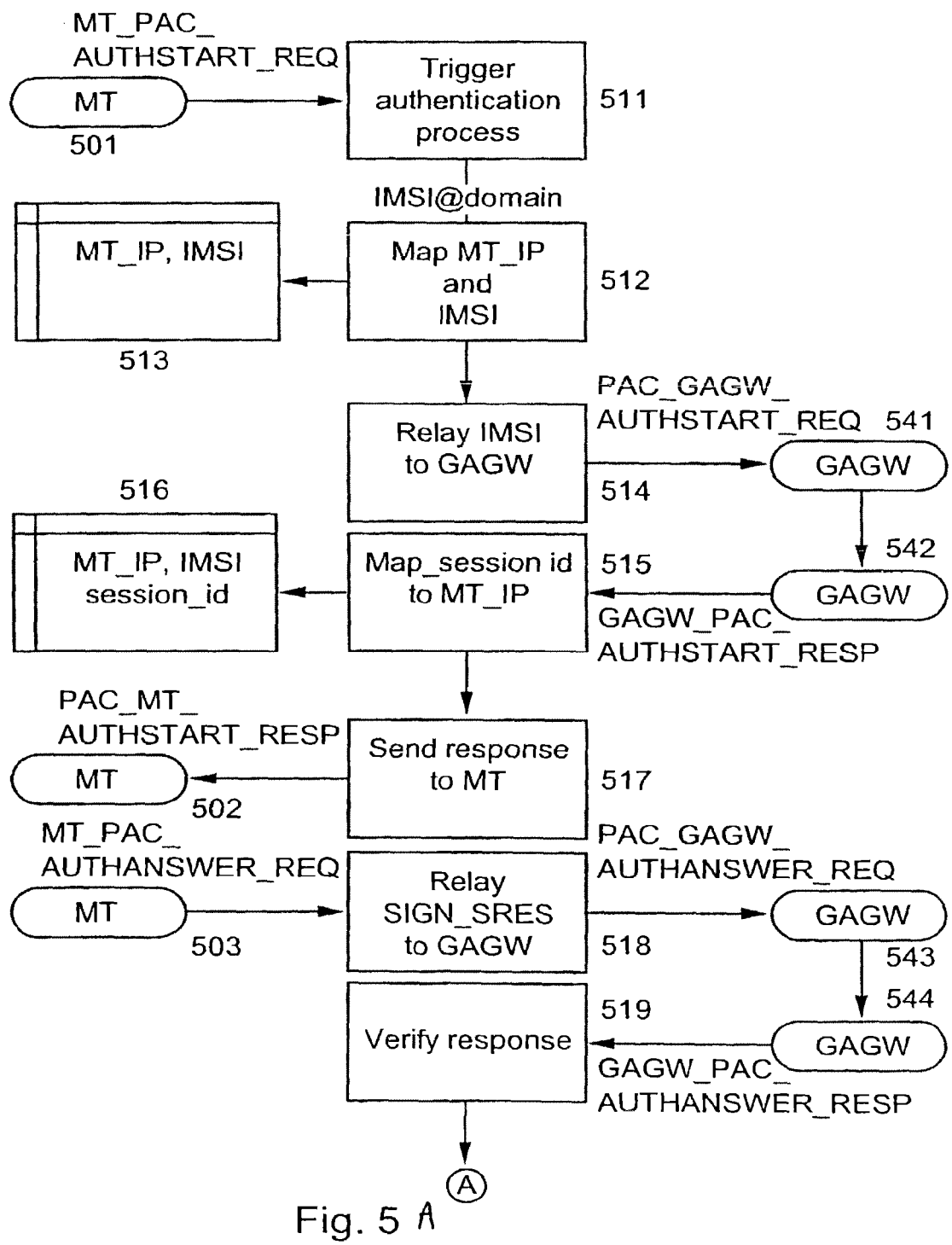
FIGS. 5A and 5B show the functionality of a public access controller (PAC) during the authentication of a system of FIG. 1.
Figure 6A:
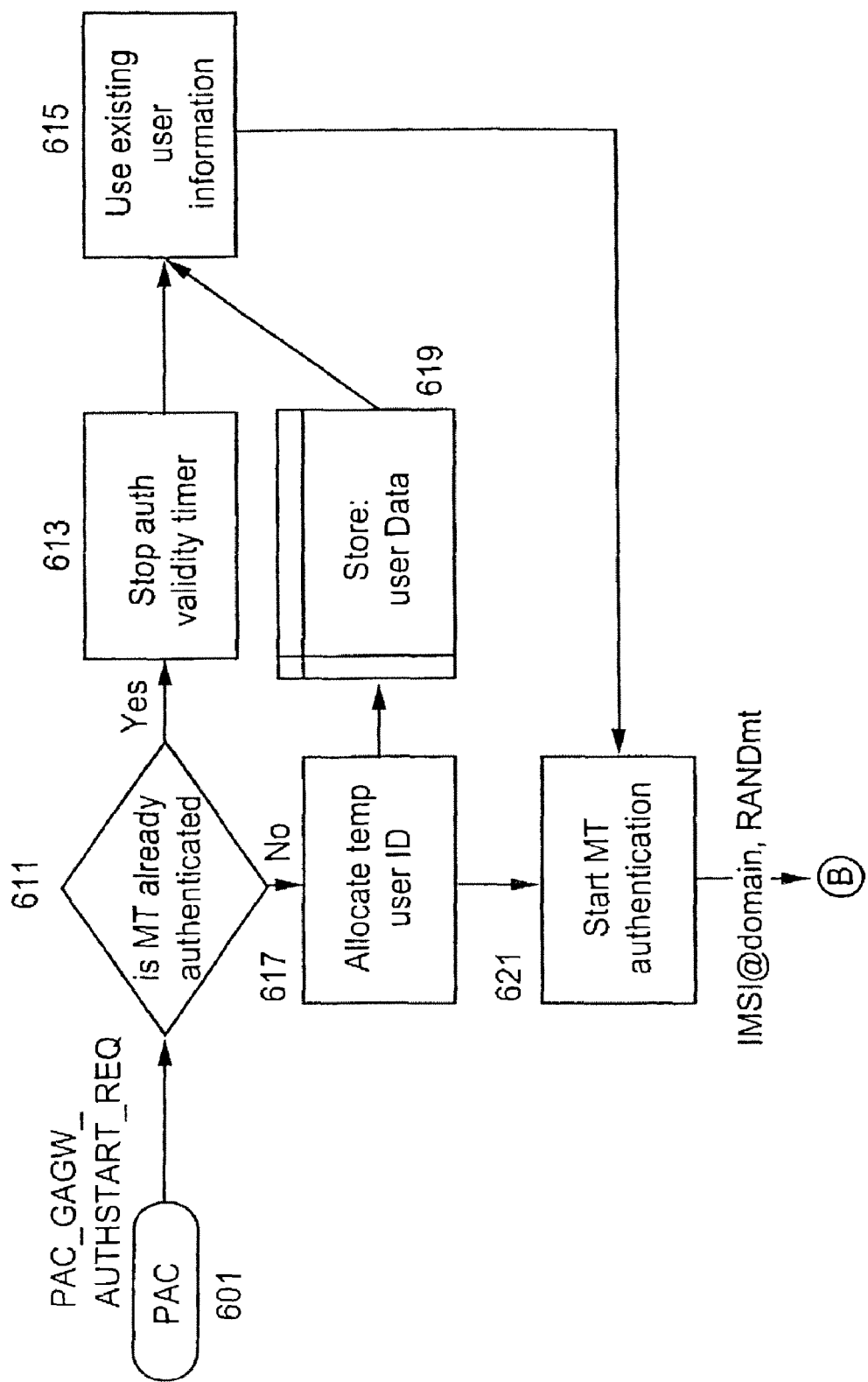
FIGS. 6A-D show the functionality of the GSM/General Packet Radio Service GPRS Authentication and billing Gateway (GAGW) during the authentication of a system of FIG. 1.
Figure 6B:
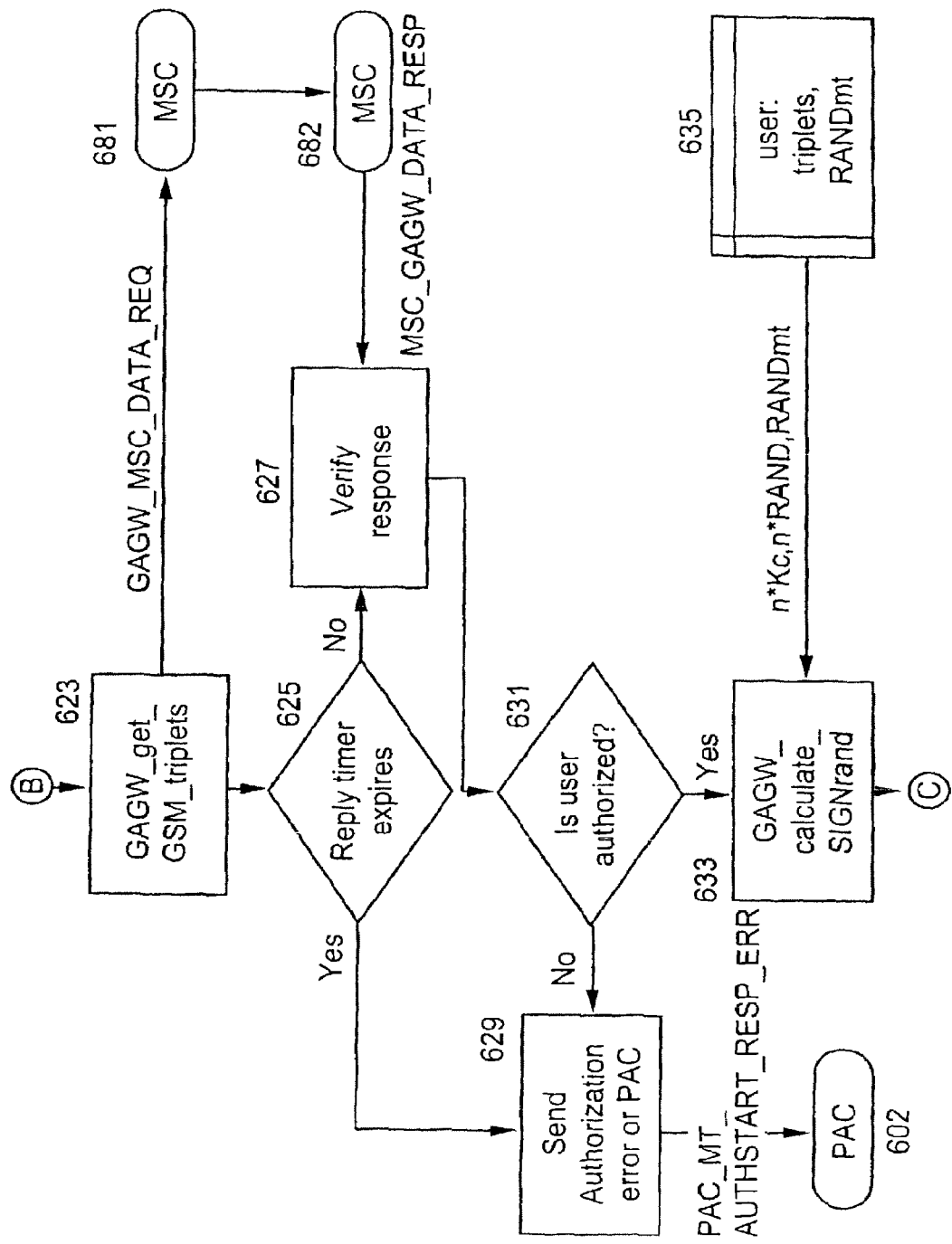
Figure 6C:
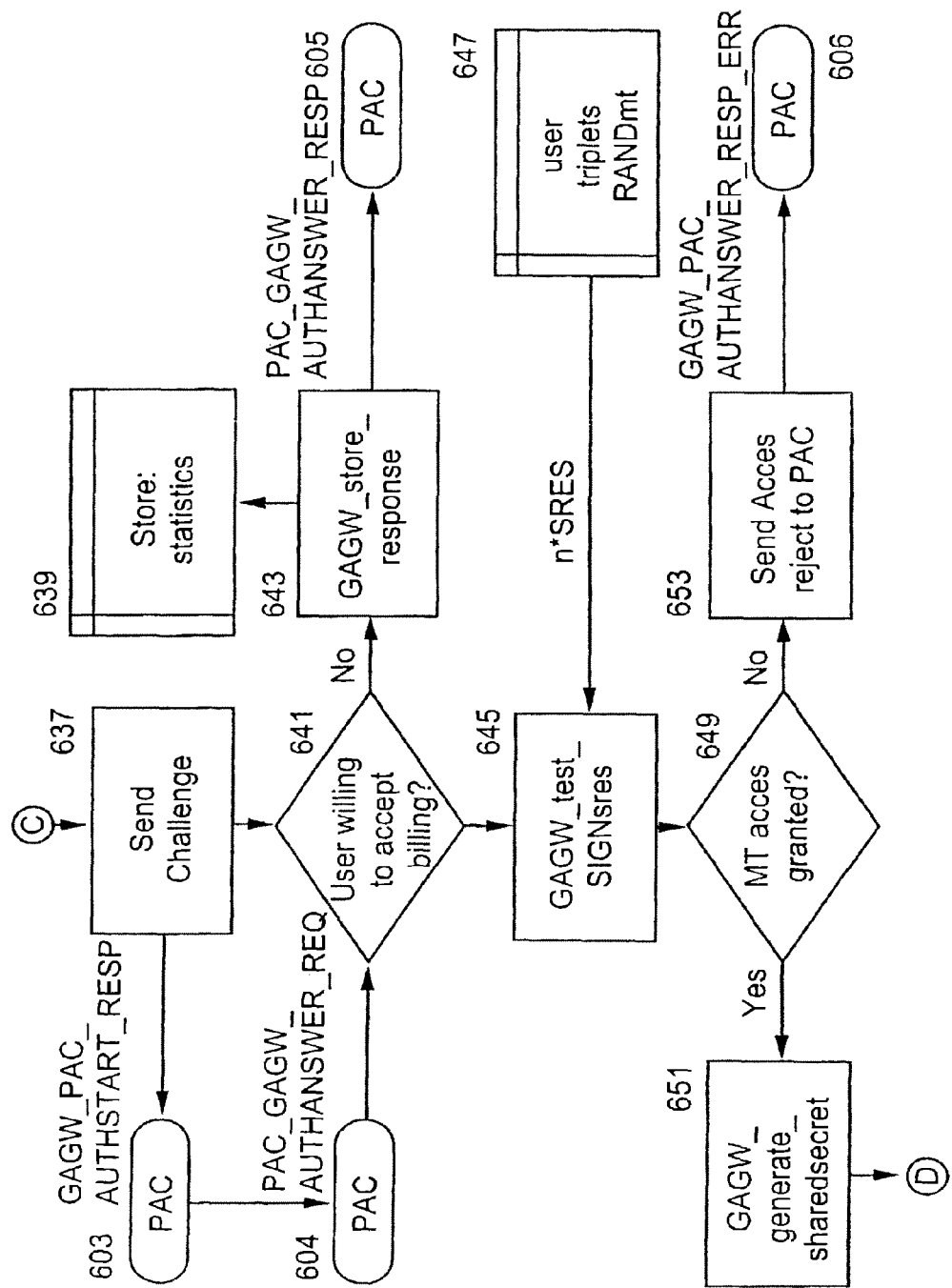
Figure 6D:
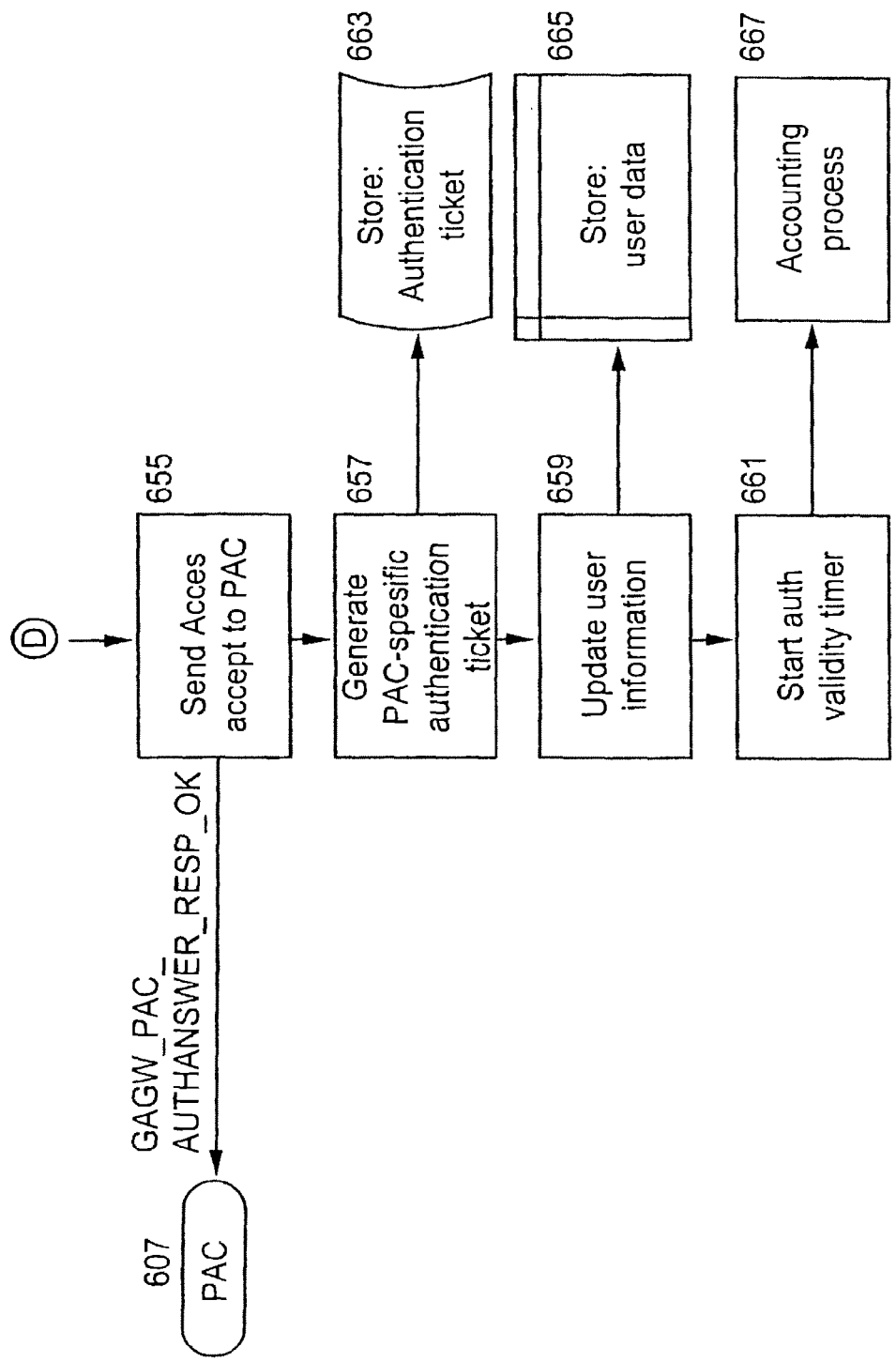

FIGS. 6A-6D show the functionality of the GSM/GPRS Authentication and billing Gateway (GAGW) during authentication in a system of FIG. 1. FIG. 5 illustrated the functionality of the PAC and here the same procedure is considered from the GAGW's point of view. The procedure starts from block 601. The PAC sends to the GAGW the PAC_GAGW_AUTHSTART_REQ message containing the IMSI and the domain name of the MT (defined by the SIM). The GAGW checks (block 611) whether the MT is already authenticated. If yes, then an authentication validity timer (described later) is stopped (block 613) and existing user information is used (block 615). Otherwise, a temporary user ID is allocated to the MT identified by the IMSI and the subscriber's data (IMSI and corresponding user ID) is stored (block 619) in a record of a database.

Then, the MT authentication is started (block 621). The GAGW requests (block 623) the GSM triplets from the home GSM telecommunications network of the subscriber by a GAGW_MSC_DATA_REQ message sent to the closest MSC 681. The MSC responds (block 682) by an MSC_GAGW_DATA_RESP message containing one or more GSM triplets and additionally information concerning whether or not the MSC allows billing for the use of the PAC by that user. The GAGW verifies (block 627) the response. If the user is not authorized to the billing service, or alternatively, if the reply timer expires (block 625), the GAGW sends (block 629) an authorization error message GAGW_PAC_AUTHSTART_RESP_ERROR to the PAC (block 602).

Otherwise, the timer has not expired and the verification of the response is positive and the procedure continues from block 633. The GAGW retrieves from the database (block 635) the RAND_MT and at least one GSM triplet associated to the subscriber being authenticated. Then the GAGW calculates a SIGNrand using a hash function and the Kc and RAND of (each of) the GSM triplet(s) used. This certain number of Kcs is denoted by n*Kc. Here, the asterisk does not refer to a multiplication but to the number of different valued parameters Kc. The same applies to all the other occurrences of asterisk as well. For multiplication, a dot "." is used instead of an asterisk. As the MSC typically provides one to four different GSM triplets in response to one request, one or more triplets can be used for authentication. By using two or more triplets instead of just one, enhanced security is obtained because the keys are longer and the recurring period, in which the same key is used again, increases. This further allows increase of the validity term of the authentication keys formed.

In block 637, the GAGW sends a challenge (SIGNrand) in a GAGW_PAC_AUTHSTART_RESP message to the PAC (block 603). The PAC responds with a PAC_GAGW_AUTHANSWER_REQ message to indicate if the user is willing to accept the billing. The GAGW checks (block 641) the message and if the check shows that the user does not accept billing, the GAGW stores (block 643) the response for statistical purposes (block 639) and sends a GAGW_PAC_AUTHANSWER_RESP message to the PAC to acknowledge to the PAC that the authentication is to be aborted. The statistical purposes include gathering information on that how many of the users have accepted and how many have not accepted the billing. This information can be used for optimizing the price for the connection in order to maximize the profits of the WISP operators and GSM telecommunications network operators.

If the message PAC_GAGW_AUTHANSWER_REQ indicates that the user is willing to accept the billing, the GAGW tests (block 645) the SIGNsres. This testing is carried out by computing the SIGNres using the hash function known by the MT and using the same input data (nonce_MT, Kc and RAND of each of the GSM triplets used). For the testing, the GAGW retrieves (block 647) the input data from the database. As a next step (block 649), the GAGW tests whether the SIGNsres was indeed correct.

If the SIGNsres was incorrect, the GAGW sends (block 653) a reject message GAGW_PAC_AUTHANSWER_RESP_ERR to the PAC (block 606).

If the SIGNsres was correct, the GAGW grants the MT access and generates (block 651) a shared secret Kpac_MT. Then, the GAGW sends (block 655) access accept by a message GAGW_PAC_AUTHANSWER_RESP_OK to the PAC (block 607). Furthermore, the GAGW generates (block 657) a PAC-specific authentication ticket and stores (block 663) it. Then the GAGW updates (block 659) the user information in the database and stores (block 665) the user data comprising the generated shared secret. Finally, the GAGW starts (block 661) the authentication validity timer (mentioned also in relation to block 613) and starts an (block 667) accounting process. The authentication validity timer is preferably implemented by storing to the database the lapsing time of the authentication. This enables use of the common hardware (clock) for a plurality of different users and easy checking of expiry of the authentication by comparison of the present to the lapsing time.

Access to the WISP by the MT is charged to the user's GSM account. When the MT is authenticated to the WISP, the PAC starts collecting billing information. The PAC maintains a database of the connection time and amount of data sent. When the MT disconnects, the PAC relays this information to GAGW. The GAGW then generates a GSM Call Detailed Record (CDR) ticket and relays the ticket to the GSM billing system known from the GSM.

Figure 7:
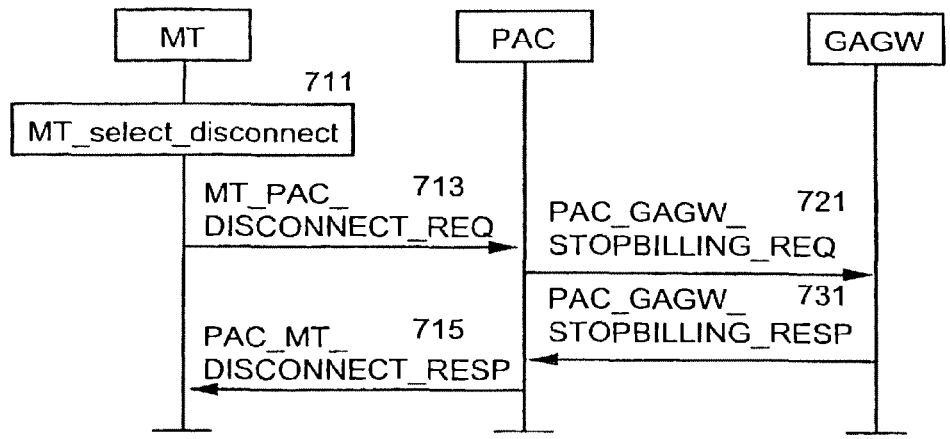
FIG. 7 shows the major signalling of a controlled disconnection of the mobile terminal from the network of a system of FIG. 1.

FIG. 7 shows the major signalling steps of a controlled disconnection of the MT from the network. The disconnecting process starts from that that the MT selects (block 711) that it be disconnected. The MT sends (block 713) an MT_PAC_DISCONNECT_REQ message to the PAC. The PAC sends (block 721) a PAC_GAGW_STOPBILLING_REQ message requesting the GAGW to stop billing. The GAGW responds by sending (block 731) a PAC_GAGW_STOPBILLING_RESP to the PAC. Finally, the PAC sends a PAC_MT_DISCONNECT_RESP message to acknowledge the MT of a successful disconnection.

Figure 8:
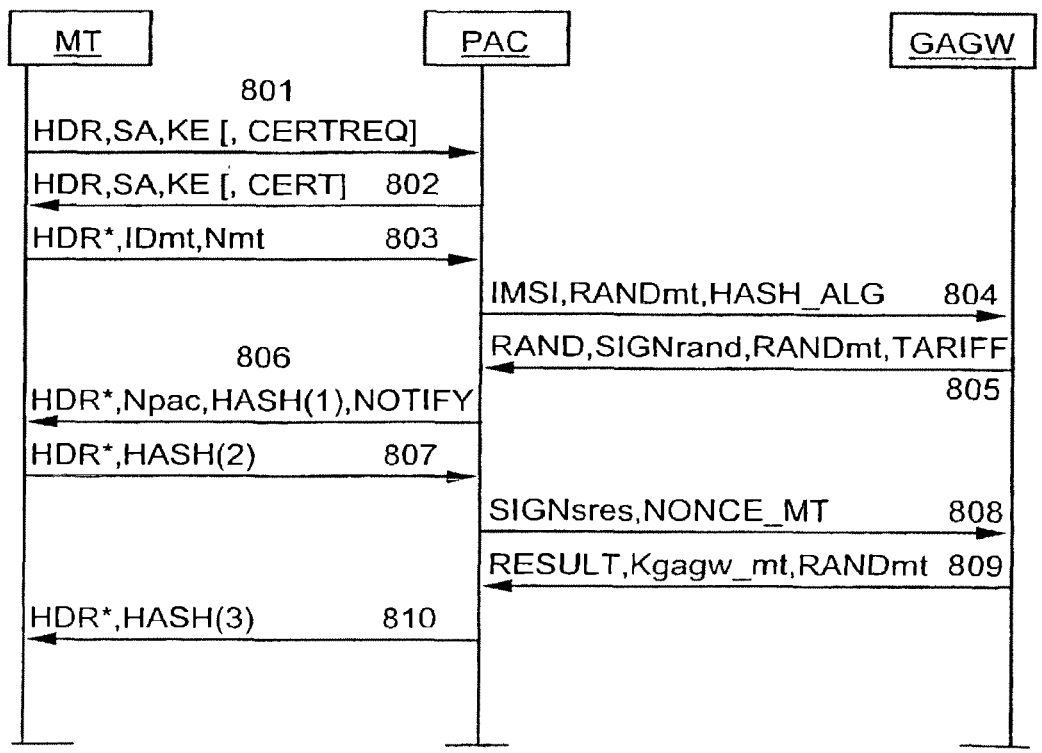
FIG. 8 shows the main signalling between the MT, PAC and GAGW, when the enhanced IKE protocol is used between the MT and the PAC.

The functional architecture of the present invention can be implemented using several suitable protocols. However, in the exemplary implementation, an enhanced Internet Key Exchange (IKE, RFC 2409) protocol is used for communications between the MT and the public access controller. Remote Authentication Dial In User Service (RADIUS, RFC 2138, RFC 2139) protocol is used for communications between the PAC and the GAGW. It should also be noted the PAC functionality could be integrated inside an access point server if needed. However, by separating the PAC functionality from the access point, handovers are easier to implement and hence the separation is appropriate for installations comprising plurality of access points. FIG. 8 shows the main signalling between the MT, PAC and GAGW, when the enhanced IKE protocol is used between the MT and the PAC.

HDR is an Internet Security Association and Key Management Protocol (ISAKMP, RFC 2409) header whose exchange type defines the payload orderings When written as HDR* payload encryption is indicated. SA is an SA negotiation payload with one or more Proposal and Transform payloads. KE is the Key Exchange payload. IDmt is the identity payload for the MT.

A GSM/GPRS SIM based user mobility management functionality (user authentication and billing) can be used for public WLAN access zone authentication and billing functions. The SIM based authentication involves relatively trustworthy verifying the user's identity (authentication) for charging the user. Advantageously, the roaming service is implemented using existing SIM cards and the GSM infrastructure. Consequently, the WISP roaming should not require any extra security keys from the MT. Furthermore, all the cellular users who obtained WLAN roaming service from their home operator have requisite the MT, SIM and necessary roaming software to be able to access the public network.

This example depicts the basic architecture and functionality for SIM based authentication. The example implementation utilized enhanced IKE protocol and RADIUS. However, the objective is to introduce and protect a scalable concept which allows to integrate GSM SIM authentication with IP authentication and to generate reliable session key between the MT and a third party (here PAC) using GSM SIM shared secret.

This invention can be applied to various applications areas. In can be used in public WLAN network authentication. In this application, the invention offers a new complementary authentication mechanism which allows to implement WLAN—cellular network interworking solution. Furthermore, the same kind of principal authentication idea could be adopted an a complementary mechanism for corporate firewall authentication.

Figure 9:
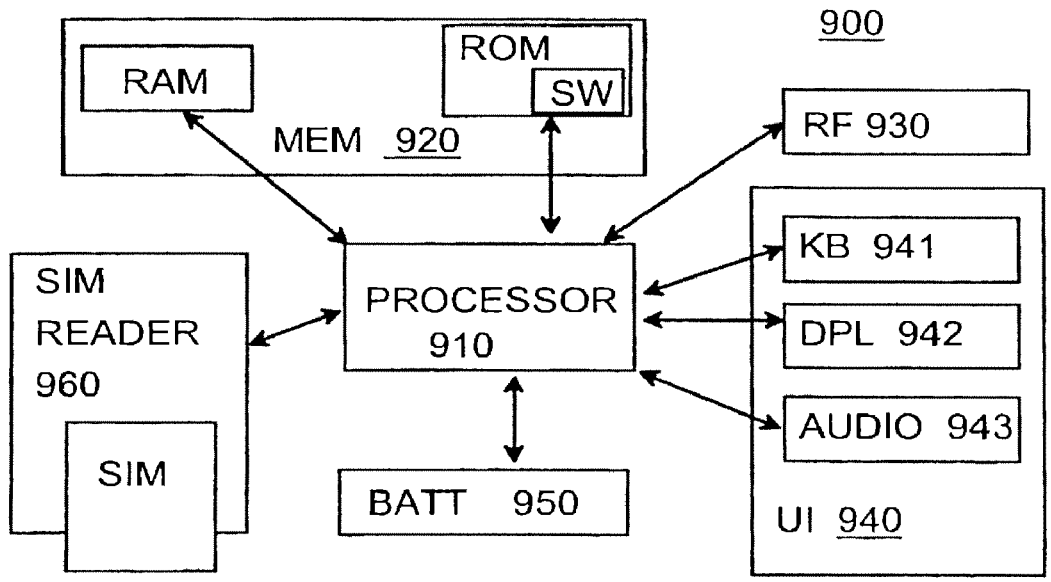
FIG. 9 shows a block diagram of the MT.

FIG. 9 shows a block diagram of the MT 900. The MT 900 comprises a processor 910, a memory 920, comprising a working memory and a non-volatile memory, an RF block 930, a user interface 940 and a portable power supply 950. The processor controls operation of the other blocks. The portable power supply 950 energizes the MT 900.

The processor 910 is typically a microprocessor or Digital Signal Processor. The working memory is typically Random Access Memory or flash-RAM. The non-volatile memory is typically Read Only Memory, mass memory, or flash-RAM. The user interface 940 comprises keys, typically in form of a keyboard 941 or keypad, a display 942, and audio equipment 943 for audio signal input and/or output. These aforementioned are merely examples and their equivalents may be employed as well.

The processor controls the MT 900 to operate in accordance with any selected embodiment of the present invention. The hardware, or the blocks of MT 900, are similar to those in prior art, but controlled by computer program code SW stored in the memory 920 (typically in the non-volatile portion) in order to implement the present invention.

For example, the processor 910 controls the RF device 930 to communicate over a radio interface, typically using Low Power Radio Frequency data transfer.

Figure 10:
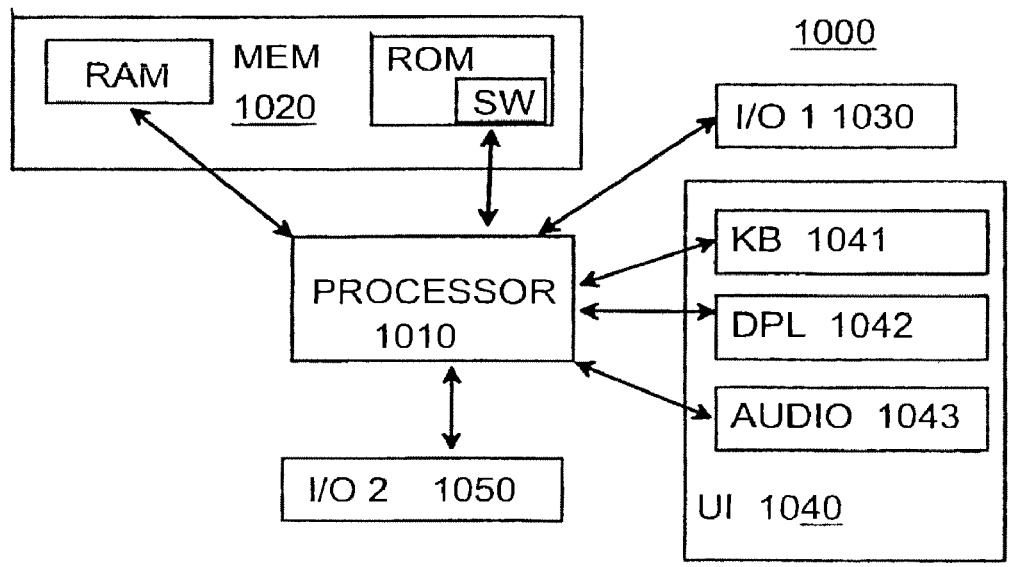
FIG. 10 shows a block diagram of a network element 1000 for using the invention.

FIG. 10 shows a block diagram of a network element 1000 for using the invention. The network element may be, for example, a GAGW. The network element 1000 comprises a a processor 1010, a memory 1020, comprising a working memory and a non-volatile memory, a first Input/Output (I/O) block 1030, a user interface 1040 (optional) and a second I/O block 1050. The processor controls operation of the other blocks.

The processor 1010 is typically a microprocessor or Digital Signal Processor. The working memory is typically Random Access Memory or flash-RAM. The non-volatile memory is typically Read Only Memory, mass memory, or flash-RAM. The user interface 1040 comprises keys, typically in form of a keyboard 1041 or keypad, a display 1042, and audio equipment 1043 for audio signal input and/or output. These aforementioned are merely examples and their equivalents may be employed as well.

The processor controls the network element 1000 to operate in accordance with any selected embodiment of the present invention. The hardware, or the blocks of the network element 1000, is typically similar as in prior art, but controlled by computer program code stored in the memory 1020 in order to implement the present invention. Alternatively, the operation can be arranged by dedicated hardware (in particular, using Application-Specific Integrated Circuits, ASICs).

The I/O blocks 1030 and 1050 are provided for interfacing with different networks. Typically, if the network element 1000 is a GAGW, the first I/O 1030 interfaces the GAGW with a PAC, and the second I/O interfaces the GAGW with an MSC. Correspondingly, the network element 1000 may be PAC, in which case the first I/O 1030 interfaces the PAC with GAGW, and the second I/O interfaces the PAC with an MT. In some cases, the network element 1000 may only have one I/O, when connected to only one network, for example if it is connected to the other relevant blocks through the Internet.

As an advantage of the present invention, a scalable authentication solution is provided for WLANs. This authentication is also applicable to public WLAN roaming networks. Furthermore, it offers a scalable GSM based billing for WLAN environment. As yet another advantage, an embodiment of the invention facilitates WLAN—cellular telecommunications network interoperability. The invention allows existing cellular telecommunications operator user database and SIMs to be used for billing in WLAN environment.

The presented embodiments should be considered illustrative, but not restricting. For example, the type of the telecommunications network may vary: the telecommunications need not be a GSM network, but may be, for example, a third generation mobile telecommunications network. Consequently, the various options of implementing the invention as determined by the claims, including the equivalent implementations, also belong to the scope of the present invention.

ABBREVIATIONS

AAA Authentication, Authorization and Accounting
FA Foreign Agent
GAGW GSM Authentication Gateway
GSM Global System for Mobile communications
GSM RAND, Kc, and SRES triplet
HA Home Agent
HDR Internet Security Association and Key Management Protocol (ISAKMP) header whose exchange type defines the payload orderings
HLR Home Location Register (a GSM network element)
IMSI International Mobile Subscriber Identifier, used in GSM
IPsec Internet Protocol Security protocol
ISAKMP Internet Security Association and Key Management Protocol
Kc A 64 bit long key produced by a SIM
Ki Subscriber authentication key, used in GSM and stored on the GSM network (for example HLR) and on the SIM
MN Mobile Node (Mobile IP client)
MD5 Message Digest 5
MSC Mobile Switching Center (a GSM network element)
MT Mobile terminal
NAI Network Access Identifier, for example user@nokia.com or imsi@gsm.org
RAND A 128 bit random number used as a challenge in GSM authentication
RAND_MT A random key for protecting against replay attacks, MT generated
SIM Subscriber Identity Module
SPI Security Parameter Index
SRES Signed Result, a 32 bit response in GSM authentication

The invention claimed is:

1. A method for charging for a user's terminal's accessing of a packet data network, the method comprising:
forming a data link between the terminal and the packet data network;
receiving from the terminal a user identity suitable to identify the terminal to an external telecommunications network;
generating billing data based on the user identity;
sending the billing data to an accounting server of the external telecommunications network;
generating a billing code corresponding to the price of accessing the packet data network;
generating a cryptographic checksum using at least the billing code; and
using the cryptographic checksum in a billing set up to verify that the user is provided with the correct price and that the user has accepted the access for that correct price.

2. A method according to claim 1 further comprising providing the terminal with access to a subscriber identity module having the user identity.

3. A method according to claim 1 further comprising authenticating the terminal using the subscriber identity module.

4. A method according to claim 1, wherein the packet data network is a public wireless internet protocol access network.

5. A method according to claim 1, wherein the data link is formed directly between the terminal and the packet data network.

6. A non-transitory computer readable medium encoded with a computer program for controlling a packet data network accessible to at least one user's terminal, comprising:
computer program code for causing the network to form a data link between the terminal and the packet data network;
computer program code for causing the network to receive from the terminal a user identity suitable to identify the terminal to an external telecommunications network;
computer program code for causing the network to generate billing data based on the user identity;
computer program code for causing the network to send the billing data to an accounting server of an external telecommunications network;
computer program code for causing the network to generate a billing code corresponding to the price of accessing the packet data network;
computer program code for causing the network to generate a cryptographic checksum using at least the billing code; and
computer program code for causing the network to use the cryptographic checksum in billing set up to verify that the user is provided with the correct price and that the user has accepted the access for that correct price.

7. A non-transitory computer readable medium according to claim 6, further comprising computer program code for causing the network to authenticate the terminal using the subscriber identity module.

8. A non-transitory computer readable medium according to claim 6, wherein the packet data network is a public wireless internet protocol access network.

9. A non-transitory computer readable medium according to claim 6, wherein the data link is formed directly between the terminal and the packet data network.

10. A method in a mobile terminal for charging of accessing a packet data network, the terminal being related to a subscriber identity module and the method comprising:
sending a terminal originated authentication starting request containing a network access identifier having an international mobile subscriber identifier, the terminal originated authentication starting request further containing a protection code;
receiving from the packet data network an authentication start response message containing one or more challenges corresponding to as many session keys and signed responses, the protection code, a billing information code, a session identity and a billing information computed for the billing information code, and a message authentication code calculated using: a hash function; the one or more challenges; and corresponding session keys;
testing with the message authentication code that the parameters carried by the authentication start response message indeed originate from a GSM telecommunications network to which the subscriber identity module is related;

handling the billing information received from the packet data network;

generating a reply message authentication code based on the corresponding signed responses to be used for responding to the packet data network;

generating a shared secret for use with the packet data network, wherein the generating of the shared secret uses at least the session keys;

generating and sending to the packet data network a reply message containing an indication whether the user accepted the billing for the service, the reply message authentication code, the message authentication code of the billing code, and the protection code; and receiving from the packet data network an authentication answer message containing a message authenticator and informing the user of a start of billing if the message authenticator contained by the authentication answer message is correct.

11. A method according to claim 10, wherein the handling comprises a sub-step of providing a user or the mobile terminal with an information of the price of the service requested by the user.

* * * * *